Feb. 26, 1952 — A. F. JOHNSON — 2,587,328
PURIFICATION OF ALUMINA-CONTAINING MATERIALS
Filed Feb. 12, 1946

INVENTOR
Arthur F. Johnson
BY
Pennie, Edmonds, Morton & Barrows
ATTORNEYS

Patented Feb. 26, 1952

2,587,328

UNITED STATES PATENT OFFICE 2,587,328

PURIFICATION OF ALUMINA-CONTAINING MATERIALS

Arthur F. Johnson, Cambridge, Mass., assignor to Reynolds Metals Company, Richmond, Va., a corporation of Delaware Application February 12, 1946, Serial No. 647,179

5 Claims. (Cl. 23—142)

This invention relates to the production of aluminum from fusions of alumina-containing materials, and is particularly directed to the purification of fusions for use in the production of aluminum containing oxidic impurities, usually one or more of the oxides $Fe_2O_3$, $SiO_2$ and $TiO_2$, the metals of which impair the quality of the aluminum. My invention provides a method for treating fusions formed of such alumina-containing material as dry bauxite, for example the calcined ore and cryolite, with a reducing agent to reduce the oxidic impurities, and the separation of the reduced metals from the fusion.

My invention provides an improved method for the treatment of cryolite fusions to remove oxidic impurities comprising the admixture of carbon and impure alumina-containing material with the fusion and the forcing of the fusion through a heated carbon filter. I apply gas pressure, preferably intermittent gas pressure to the fusion to effect its flow through the filter and cause suitable agitation.

The method of the invention involves introducing dry crude bauxite and a reducing agent including carbon, with or without aluminum, into a cryolite fusion and subjecting the fusion to heating, as by passing an electrical current therethrough, to a temperature at which the alumina is dissolved in the cryolite and the oxidic impurities are reduced and separated from the fusion. It is advantageous to reduce most of the iron oxide by means of the carbon and I prefer to separate most of the reduced iron out of the fusion and then to effect a scavenging reduction to eliminate as far as possible the unreduced iron oxide. I utilize the gas formed in the said reduction to impose a pressure on the fusion, sufficient to force the fusion through a body of hot carbon, preferably porous carbon, which not only filters out the entrained fine particles of metal but serves as the scavenging reducing agent for the iron oxide which escaped reduction by the added carbon. The aluminum reduces the $SiO_2$ and $TiO_2$ and the metallic iron serves as a collector for the silicon and titanium. I may add powdered iron to the initial charge for this purpose if the iron is relatively low.

I have found that cryolite exercises a pronounced stimulating or catalytic effect on the reduction of $Fe_2O_3$ and that the oxide is easily reduced at temperatures around 1100° C. The action of the cryolite is increased by adding to the cryolite as much as 20% of calcium fluoride, or, say 10% of calcium fluoride and from 2½ to 5% of barium fluoride. Since cryolite is the predominant agent, when I refer to cryolite fusions I include cryolite with or without calcium or barium fluoride.

It is advantageous to force the reduced fusion through the carbon filter into a body of alumina-bearing cryolite fusion, preferably a fusion from an electrolytic operation which is depleted in alumina, and to this end my invention provides for the alumina enrichment of the fusion by forcing purified alumina-rich cryolite fusion into the body of fusion. I prefer to decrease the gas pressure, specifically by interrupting the reduction and generation of gas, to permit the fusion to flow back through the filter and to mix with the charged mixture. In this manner I need add only sufficient cryolite and calcium fluoride along with the bauxite and carbon to make up for losses in cryolite.

In order to reduce the $SiO_2$ and $TiO_2$ I use aluminum or ferroaluminum and in order to save these metals I add the aluminum after the reduction of iron oxide with carbon. I may add the aluminum or its alloy to the body of fusion wherein the reduced silicon and titanium are collected by the iron and settle to the bottom. I may also pass the fusion into a second cell and there add an aluminum-containing material such as powdered aluminum or ferroaluminum to reduce the $SiO_2$ and $TiO_2$.

My invention is carried out in apparatus comprising a reduction chamber with an anode and a cathode into which the material to be treated is charged and a carbon filter in operative connection with the chamber, and means for confining the gases formed by reduction to force the fusion through the carbon filter. In its present preferred embodiment, the chamber has a gas-tight stuffing box above through which the anode enters and the lower part for receiving the admixture has a perforated metal wall in engagement with a surrounding carbon filter. Preferably, the chamber and filter are removably inserted into a surrounding refractory lined receptacle through which the alumina-depleted fusion to be enriched is circulated.

These and other novel features of the invention will be better understood after considering the following discussion taken in conjunction with the accompanying drawings, in which.

Figure 1:
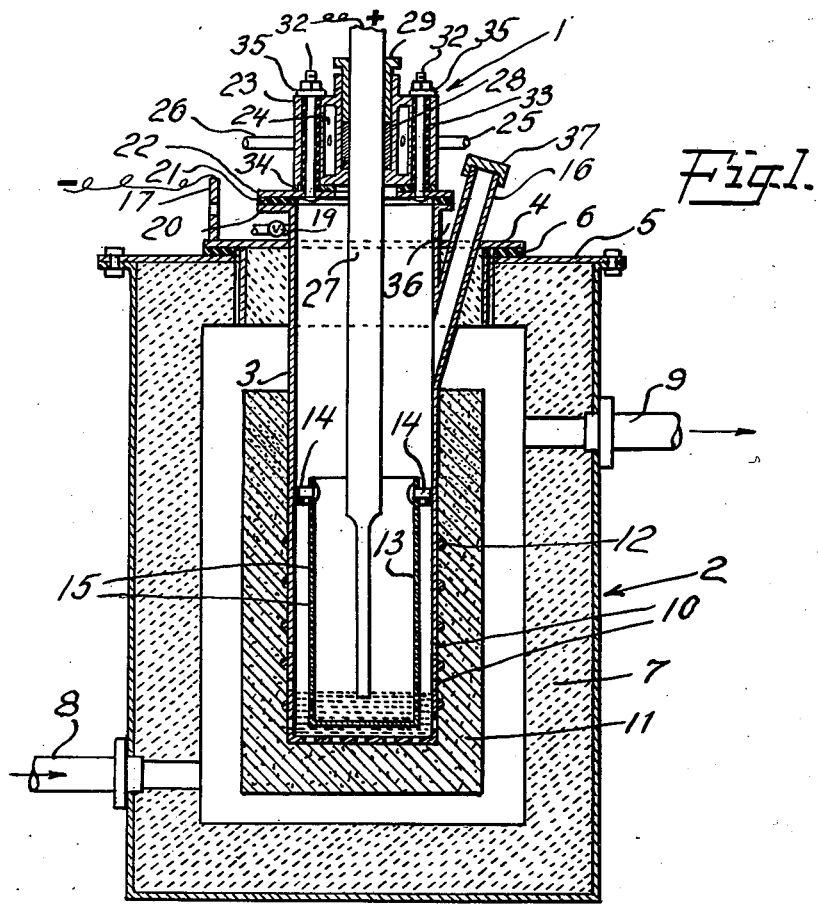
Fig. 1 is a sectional side view of apparatus embodying the invention.
Figure 2:
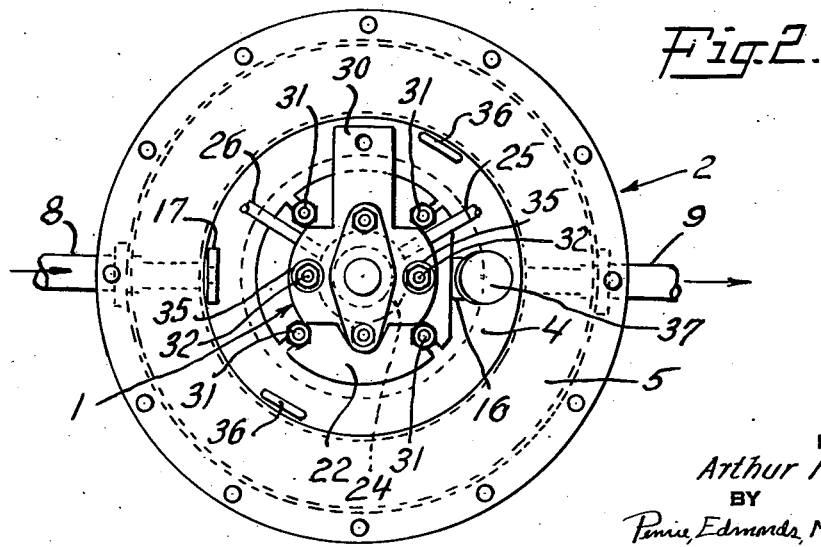
Fig. 2 is a plan view of the apparatus of Fig. 1.

The apparatus illustrated in Figs. 1 and 2 comprises two different parts, a removable unit I which I call a "breather cell" resting upon a receptacle 2. The breather cell comprises a reduction chamber 3 formed of steel which is cylindrical in cross-section with a flat bottom, and a supporting flange 4 welded near its top. The flange 4 supports the breather cell on the top 5 of the receptacle and a layer of asbestos or other suitable insulation 6 is inserted between the flange and the top to exclude air and to electrically insulate the breather cell from the receptacle. The receptacle is lined with a refractory, such as carbon pot lining 7, and is provided with an inlet duct 8 for introducing an alumina-containing fusion into the receptacle and an outlet duct 9 for removing an alumina-enriched fusion from the receptacle. As shown in the drawings, the reaction chamber of the breather cell is suspended in the space within the receptacle and the lower portion, sides and bottom, are perforated with a multiplicity of holes 10 which may, for example, be around ½ to ¾ inch in diameter. A porous carbon filter 11 is molded around the exterior of the lower portion of the reaction chamber and is held in position by the weld beads 12. While I prefer to use a molded carbon filter, as shown, I may attach a jacket around the reaction chamber and fill it with pulverized coke, or other suitable form of carbon. Within the lower portion of the reaction chamber, the removable bucket 13 is suspended by the pins 14. The sides of the bucket (not the bottom) are perforated by a multiplicity of small holes 15, for example, holes around $\frac{3}{16}$ inch in diameter, and its position is such that feed materials introduced through the feed pipe 16 fall into the bucket. The bar 17 welded to the flange 4 is the cathode connection and the entire metal structure including reaction chamber 3 and bucket 13 is cathodic. The bleeder valve 19 is connected to the chamber 3 to reduce the pressure therein to atmospheric pressure a short time after the generation of gas is stopped.

The reaction chamber extends upwardly above the flange 4 and has a top flange 20 covered with an annular insulating gasket 21, such as one formed of asbestos, and the electrode holder is electrically insulated therefrom. The electrode holder comprises a contact member 23 having an annular space 24 for the circulation of cooling water by means of the pipes 25 and 26. The space surrounding the graphite anode 27 is filled with a metallic packing 28 which is pressed into gas sealing and good electrical contact with the anode by the gland member 29. The positive electrical terminal of the power line is connected directly to the extending contact bar 30 of the electrode holder. The annular flange 22 rests upon the insulation 21 and is secured in place by the bolts 31. The flange 22 has four bolts 32 welded thereto which extend up through insulating sleeves 33 mounted in holes in the contact member and the contact member rests on an insulating washer 34 over the flange 32. The insulating washers 35 for bolts 31 are between the contact member and the nuts and the contact member is completely insulated from the cathode chamber 3.

The eye-bolts 36 attached to the flange 4 are the means by which the entire breather cell may be lifted off the receptacle 2.

In carrying out an operation of the invention in the apparatus illustrated in the drawings, the receptacle 2 is filled with an alumina-containing cryolite fusion, such as one depleted in alumina from an electrolytic cell (not shown) which enters through the pipe 8 by pumping or other suitable flow means. The charge introduced into the reduction chamber 3 is preferably in the form of a dry pulverulent mixture. In the purification of impure bauxite ore, for example, the ore is calcined and preferably ground up with coke or other form of carbon. The carbon is in an amount sufficient to reduce the iron oxide. Where the iron content is relatively low, a small amount of powdered iron may be included in the charge because the iron performs the important function of collecting the reduced silicon and titanium.

The charge is introduced through the feed pipe 16 in an amount sufficient to fill the lower portion of the reaction chamber to a point above the top of the bucket 13 and the breather cell is closed gas-tight. An electric current of, say, around 5 volts is passed through the electrodes, a certain amount of electrolysis takes place with the heating of the charge to a temperature around 1000° to 1300° C., and the cryolite dissolves the alumina leaving the oxidic impurities in a condition susceptible to effective reduction. The cryolite and also the calcium fluoride have a pronounced stimulating effect on the reduction of the iron oxide and in this capacity serve somewhat as a catalyst. A large part of the reduced iron falls to the bottom of the basket 13 where it remains. During the reduction, the gases formed accumulate in the upper portion of the reaction chamber and create a sufficient pressure to force the alumina-enriched fusion through the holes 10 and 13 and through the pores or spaces in the carbon filter 11. The carbon filter is heated to a temperature of around 1100° C., and in view of the tortuous passage therethrough for the fusion, a large heated carbon surface is presented to the fusion with the result that the carbon acts as a chemical scavenger for the reduction of the iron oxide which escaped reduction with the carbon of the charge in the reduction chamber. The fusion leaving the carbon filter is, accordingly, very low in iron oxide and is high in alumina. The iron reduced in the carbon filter remains trapped therein, and as the filter becomes laden with metal, it is necessary to replace it with a new filter. Since the amount of metal to be reduced in the filter is not great, the filter lasts a considerable time. It is advantageous to pulverize the filter and use it as carbon to be admixed with the crude ore, thus saving both the carbon and its contained metal. This metal, of course, enters the basket when the carbon is used in the next operation.

One of the characteristic features of my invention is the simple means by which I effect a pulsating flow of fusion through the filter. During electrolysis iron oxide reacts with the added carbon and with the graphite of the anode to form carbon monoxide and carbon dioxide, which gases impose a pressure on the surface of the fusion in chamber 3. It will be noted that the lower portion of the anode is small in diameter, having been penciled away by the reaction with oxygen. As the gas pressure in reduction chamber 3 increases and the fusion within the lower portion thereof is forced downward to the lower end of the anode, the current density becomes so great that the "anode effect" interrupts the electrolytic operation. At this time, the purified and alumina-enriched fusion is substantially all forced into the surrounding alumina-depleted fusion in the receptacle 2. A small amount of aluminum is reduced in the cell which serves as a reducing agent for the impurities. The cover 37 is removed and a fresh charge is introduced. Either because of the bleeder valve 19 or the removal of the cover 37, the pressure in chamber 3 is reduced to atmospheric pressure and the fusion in the vessel 2 flows back through the filter into the lower portion of the reaction chamber. Accordingly, some cryolite fusion is in the reduction chamber for starting the next cycle. It will be understood, of course, that the fusion in receptacle 2 is circulating and the fusion which flows back through the filter into the reduction chamber is not the enriched fusion.

The reduction of $SiO_2$ and $TiO_2$ may be effected in chamber 3 by adding aluminum along with the charged materials, but for purposes of economy and better separation of the reduced metals I prefer to add powdered scrap aluminum or powdered ferroaluminum after the iron oxide has been largely reduced. When I refer to aluminum in the claims, I mean metallic aluminum or its alloy such as ferroaluminum. I may add the aluminum to the fusion in receptacle 2 to reduce these oxides. In a more advantageous embodiment, I pass the fusion from receptacle 2 into another similar receptacle in which is mounted another breather cell. In this breather cell I add the aluminum-containing material. There is an advantage in adding ferroaluminum because it provides iron for collecting silicon and titanium and, moreover, the unreacted ferroaluminum dissolves silicon and aluminum forming a carbon-free alloy saturated with silicon and titanium thus not only separating these impurities from the fusion but forming a valuable alloy. The iron which collects silicon and titanium and the alloy with ferroaluminum settle out in the bucket and may be recovered by removing and emptying the bucket. In this second breather cell there is no added carbon to form gas, but there is sufficient oxidation of the anode to form enough gas to give the breather action.

I may use a screw feed in place of the pipe 16 and feed the raw material more or less automatically. I may also use the electrodes mainly for starting and thereafter carry out the operation by chemical reduction in which the gas is formed by reaction of the added carbon with the iron oxide.

I may provide breather cells in which I heat the mixture in the reduction chamber with alternating current electrodes, for example, three electrodes of a three-phase system in which the voltage and current may be controlled as in the usual three-phase electric arc furnace. The breather action may be caused by the oxycarbon gases of reduction or by gas added to the reduction chamber from an outside gas system. In those breather cells wherein most of the reduction is with aluminum, I may flow the fusion back and forth through the carbon filter by means of a suitable pump. For example, I may use a pump such as described and claimed in my copending application, Serial Number 644,252, filed January 30, 1946 (now abandoned), to provide intermittent variations in pressure in the reduction chamber.

In describing my invention I have described processes in which such fusions are passed or flowed through carbon filters described and claimed in my Patents Nos. 2,451,491, 2,451,492 and 2,451,493 granted October 19, 1948. My present invention is an improvement upon such processes particularly in that I apply gas pressure to the fusion to effect its flow through the filter and cause suitable agitation.

I claim:

1. In the method of purifying alumina-containing materials having oxidic impurities including $Fe_2O_3$, $SiO_2$ and $TiO_2$ by providing in a reduction chamber a mixture of alumina-containing material, cryolite and carbon, heating the mixture to a sufficient temperature to dissolve the alumina in the cryolite and reducing a large part of the iron oxide, separating the reduced iron from the fusion and passing the fusion through a heated carbon filter to reduce remaining iron oxide, and removing the iron reduced in the filter from the fusion, the improvement which comprises confining within the reduction chamber the gases generated by the reduction, and applying the pressure of such gases to force the fusion to pass through the heated carbon filter.

2. In the method of purifying alumina-containing materials having oxidic impurities including $Fe_2O_3$, $SiO_2$ and $TiO_2$ by providing in a reduction chamber a mixture of alumina-containing material, cryolite, carbon and aluminum, heating the mixture to a sufficient temperature to dissolve the alumina in the cryolite and thereby reducing a large part of the iron oxide, separating the reduced iron from the fusion and passing the fusion through a heated carbon filter to reduce remaining iron oxide, and removing the iron reduced in the filter from the fusion, the improvement which comprises confining within the reduction chamber the gases generated by the reduction, and applying the pressure of such gases to force the fusion to pass through the heated carbon filter.

3. The process of claim 1 which is further characterized by passing the purified fusion enriched in alumina into an alumina-depleted fusion.

4. The process of claim 1 which is further characterized by heating the mixture of alumina-containing material, cryolite and carbon by passing an electrical current therethrough.

5. The process of claim 3 which is further characterized by reducing the $SiO_2$ and $TiO_2$ remaining in the fusion with aluminum.

ARTHUR F. JOHNSON.

REFERENCES CITED

The following references are of record in the file of this patent:

UNITED STATES PATENTS

| Number | Name | Date |
|---|---|---|
| 477,063 | Richters | Feb. 24, 1891 |
| 1,219,333 | Kynaston | Mar. 13, 1917 |
| 1,310,342 | Hutchins | July 15, 1919 |
| 1,331,732 | Wait | Feb. 24, 1920 |
| 1,534,316 | Hoopes et al. | Apr. 21, 1925 |
| 2,451,491 | Johnson | Oct. 19, 1948 |
| 2,451,492 | Johnson | Oct. 19, 1948 |
| 2,451,493 | Johnson | Oct. 19, 1948 |

FOREIGN PATENTS

| Number | Country | Date |
|---|---|---|
| 25,408 | Great Britain | of 1907 |
| 520,851 | Germany | Mar. 14, 1931 |